US005988325A

United States Patent [19]

Matsueda

[11] Patent Number: 5,988,325

[45] Date of Patent: Nov. 23, 1999

[54] BICYCLE BRAKE

[75] Inventor: Keiji Matsueda, Shimonoseki, Japan

[73] Assignee: Shimano, Inc., Osaka, Japan

[21] Appl. No.: 08/941,645

[22] Filed: Sep. 30, 1997

[30] Foreign Application Priority Data

Oct. 4, 1996 [JP] Japan .................................... 8-264249

[51] Int. Cl.$^{6}$ ........................................................ B62L 1/00

[52] U.S. Cl. .................................... 188/24.11; 188/24.14; 188/26; 74/388 R

[58] Field of Search ............................ 188/24.11, 24.14, 188/24.22, 26, 78, 79, 82.84, 323, 343; 74/388 R; 192/64

[56] References Cited

U.S. PATENT DOCUMENTS

| | | | |
|---|---|---|---|
| 2,141,967 | 12/1938 | Ball | 192/6 |
| 5,201,236 | 4/1993 | Nagano | 188/24.14 |
| 5,421,435 | 6/1995 | Hanada | 188/24.14 |
| 5,524,734 | 6/1996 | Hanada | 188/26 |
| 5,535,855 | 7/1996 | Hanada | 188/24.14 |

FOREIGN PATENT DOCUMENTS

| | | |
|---|---|---|
| 0 064 839 A1 | 11/1982 | European Pat. Off. . |
| 0 562 288 A2 | 9/1993 | European Pat. Off. . |
| 66182 | 8/1950 | Netherlands . |

*Primary Examiner*—Robert J. Oberleitner
*Assistant Examiner*—Mariano Sy
*Attorney, Agent, or Firm*—James A. Deland

[57] ABSTRACT

A bicycle brake includes a fixed member (e.g., a hub axle) having a fixed member axis, a hub drum rotatably supported around the fixed member, and a fixed case nonrotatably fixed relative to the fixed member. The braking mechanism includes a brake member, a brake operating element disposed radially inwardly of the brake member for pushing the brake member radially outwardly, and a cam member disposed radially inwardly of the brake operating element and coupled to the fixed case. The cam member is shaped so that the brake operating element moves radially outwardly in response to relative rotation between the cam member and the brake operating element, and the cam member defines a cam member space radially inwardly of the cam member. A rotating case is coupled to the hub drum for rotating integrally with the hub drum. The rotating case has a contact surface disposed radially outwardly of the brake member for contacting the brake member when the brake member moves radially outwardly. To reduce the axial length of the bicycle brake, a portion of the hub shell is disposed within the cam member space. Alternatively, an attachment mechanism may be used for coupling the rotating case to the hub shell, wherein a portion of the attachment mechanism is disposed within the cam member space.

30 Claims, 6 Drawing Sheets

BICYCLE BRAKE

BACKGROUND OF THE INVENTION

The present invention is directed to bicycle brakes and, more particularly, to a bicycle hub brake that has a narrower width than conventional hub brakes.

The basic structure of a conventional bicycle hub brake, which is generally referred to as a roller brake, is shown in FIG. 8. As shown in FIG. 8, the hub axle 1 of the front or rear wheel of the bicycle is fixed to the frame F, and a cam 50 is swingably located about the hub axle 1. A plurality of inclined cam surfaces are provided on the outer peripheral surface of the cam member 50. A brake operating element in the form of a roller 60 (for example) is in contact with each cam surface, and a brake shoe 70 is provided radially outwardly of the roller 60. A rotatable operating arm 80 swings about the hub axle 1 and rotates the cam 50 so that the rollers 60 are pushed radially outwardly by the cam surfaces. As a result, the brake shoe 70 is displaced radially outwardly and comes in contact with a brake ring 110 that is fixed to the hub drum 2 and that integrally rotates with the hub drum 2, thereby applying braking force. As can be understood by an examination of the structure depicted in FIG. 8, the roller brake mechanism as a whole in conventional roller brakes must be attached axially in tandem to the side of the hub drum 2, resulting in the drawback of a wide brake/hub assembly.

SUMMARY OF THE INVENTION

The present invention is directed to a bicycle hub brake that has a narrower width than conventional hub brakes. This is accomplished by radially enlarging the cam member so that the cam member defines a cam member space radially inwardly thereof, and then allowing components of the hub brake assembly to project into the cam member space.

In one embodiment of the present invention, a bicycle brake includes a fixed member (e.g., a hub axle) having a fixed member axis, a hub drum rotatably supported around the fixed member, and a fixed case nonrotatably fixed relative to the fixed member. The braking mechanism includes a brake member, a brake operating element disposed radially inwardly of the brake member for pushing the brake member radially outwardly, and a cam member disposed radially inwardly of the brake operating element and coupled to the fixed case. The cam member is shaped so that the brake operating element moves radially outwardly in response to relative rotation between the cam member and the brake operating element, and the cam member defines a cam member space radially inwardly thereof. A rotating case is coupled to the hub drum for rotating integrally with the hub drum. The rotating case has a contact surface disposed radially outwardly of the brake member for contacting the brake member when the brake member moves radially outwardly. To reduce the axial length of the bicycle brake, a portion of the hub drum is disposed within the cam member space. Alternatively, an attachment mechanism may be used for coupling the rotating case to the hub drum, wherein a portion of the attachment mechanism is disposed within the cam member space.

If desired, the cam member may be rotatably coupled to the fixed case, and a cam operating member may be provided for rotating the cam member. The cam operating member includes a first link arm coupled for rotation around a rotational axis radially offset from the axle axis. A second link arm extends from the first link arm and is inclined relative to the first link arm for engaging a detent on the cam member so that rotation of the cam operating member around the rotational axis causes rotation of the cam.

In a more specific embodiment, there is a plurality of the brake members encircling the fixed member, the cam member encircles the fixed member, there is a plurality of the brake operating elements circumferentially disposed along an outer peripheral surface of the cam member, the outer peripheral surface of the cam member includes a plurality of cam surfaces, and each cam surface is disposed in close proximity to one of the plurality of brake operating elements so that the plurality of cam surfaces press the plurality of brake operating elements outwardly when the cam member and the plurality of brake operating elements rotate relative to each other. A brake operating element case may be fixed relative to the fixed case, and a plurality of the brake operating element biasing elements may be provided for biasing the plurality of brake operating elements toward their associated cam surfaces so that the plurality of brake operating elements are biased radially outwardly. This provides a rapid response when the cam member is rotated.

DETAILED DESCRIPTION OF THE EMBODIMENTS

Figure 1:
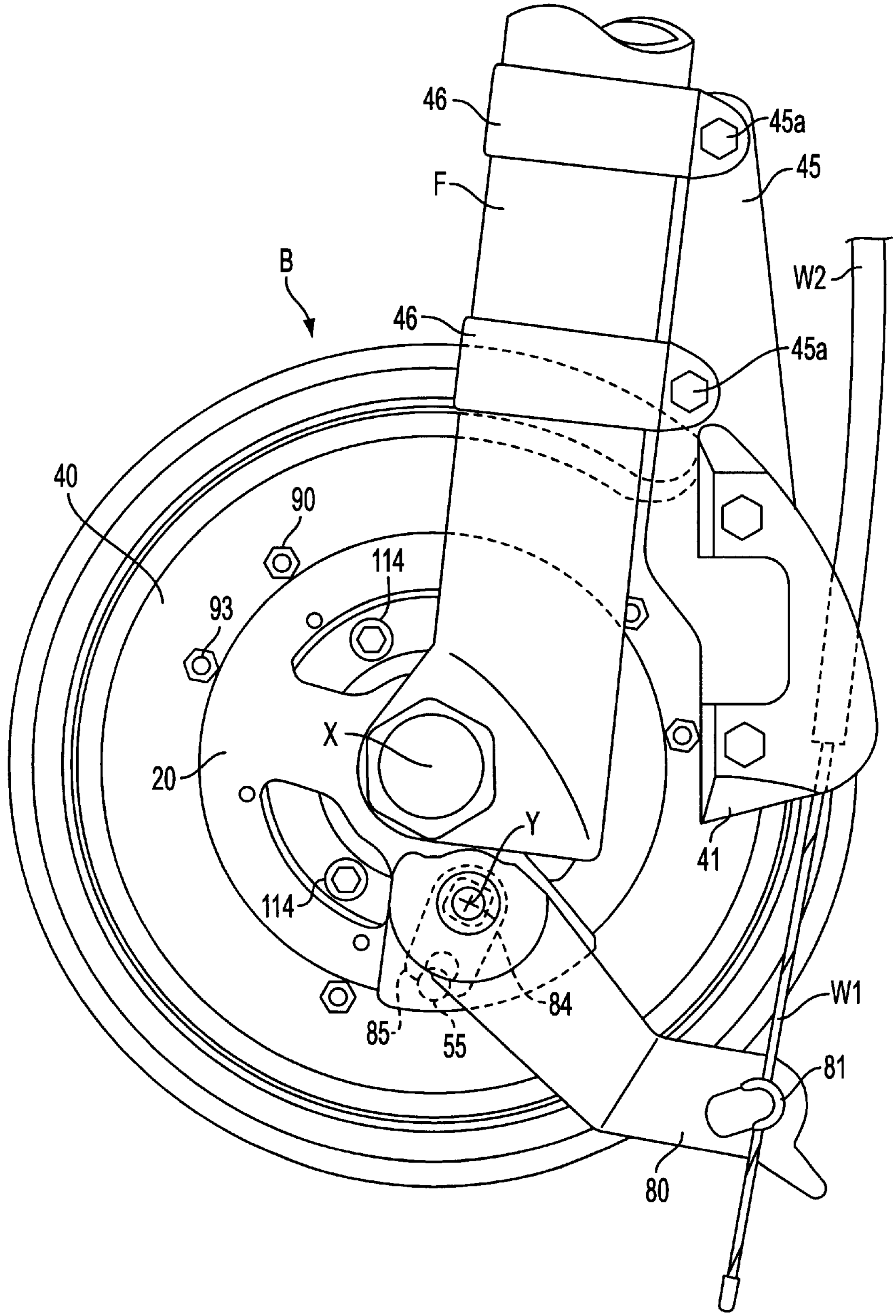
FIG. 1 is a side view of a particular embodiment of a bicycle brake according to the present invention.

FIG. 1 is a side view of a particular embodiment of a bicycle brake B according to the present invention. Bicycle brake B is attached to a bicycle frame fork F such that the left side of FIG. 1 is the forward direction of the bicycle, and the right side of FIG. 1 is the backward direction of the bicycle. The brake device B is generally referred to as a roller brake. In the present embodiment, the brake device B is attached to the front wheel hub, but it may also be attached to the rear wheel hub. The brake device B is operated by a brake operating cable W1, one end of which is connected to a brake lever mounted on the handlebar. The outer casing W2 of the cable W1 extends into a support arm 45 described below, and the other end of the cable W1 is engaged by the free end of an operating arm 80 serving as a first link arm.

Figure 3:
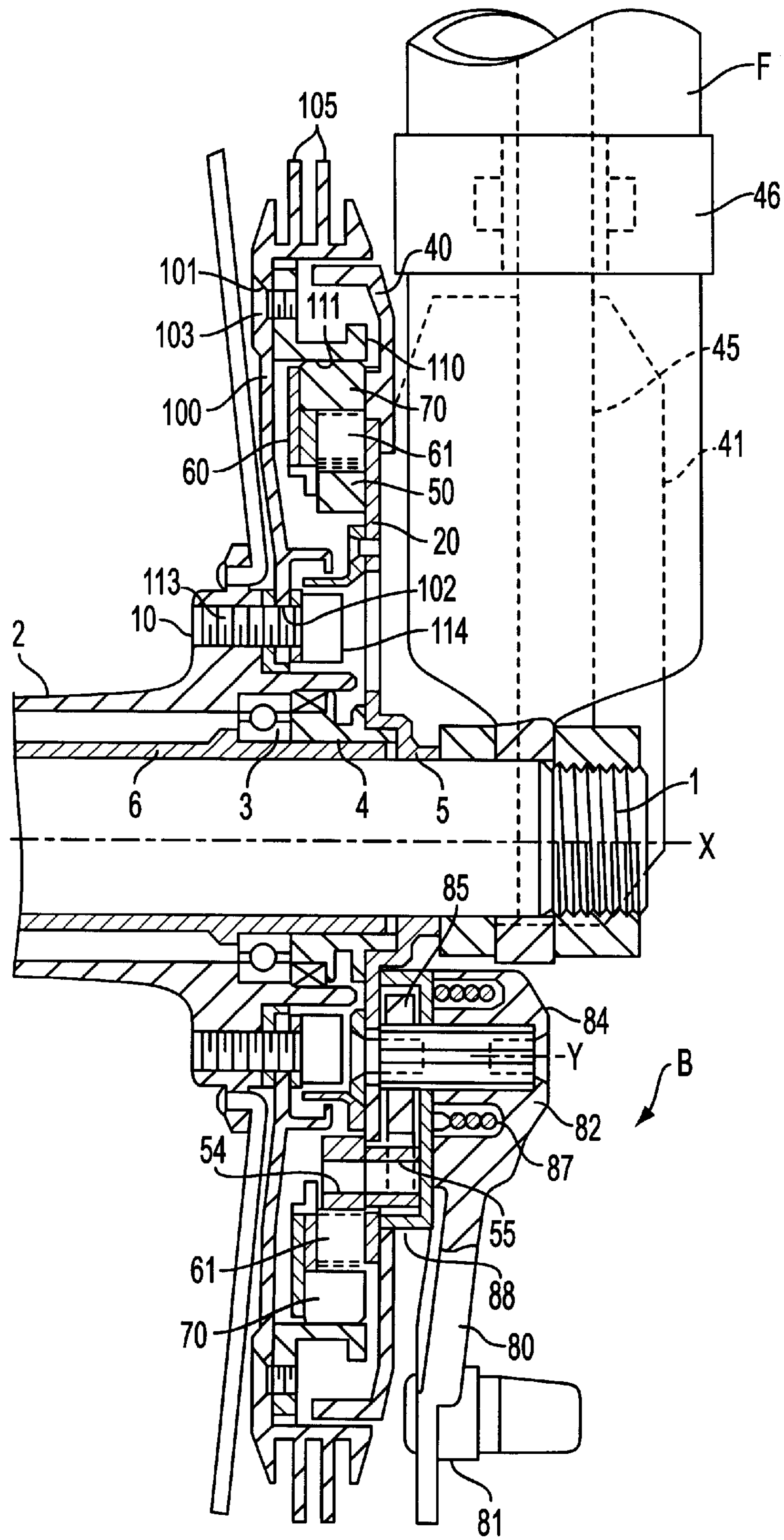
FIG. 3 is a cross sectional view if the bicycle brake shown in FIG. 1.

As shown in FIG. 3, a sleeve 6 is fixed to the outer periphery of a fixed member in the form of a hub axle, and bearings 3 are provided near either end in the axial direction on the sleeve 6 to rotatably support a hub drum 2. A first lock seat 4 is located near the right end of the sleeve 6, and a second lock seat 5 is located to the right of the first lock seat 4 and contacts the first lock seat 4. A fixed case comprising a first fixed side case 20 and a second fixed side case 40 is mounted between first lock seat 4 and second lock seat 5 and is fixed relative to hub axle 1. More specifically, the inner peripheral surface defined by a central detent hole 21 in the first fixed side case 20 is axially positioned on the first lock seat 4 so that it is held between a radially extending rim of the first lock seat 4 and the left end of the second lock seat 5.

Figure 4:
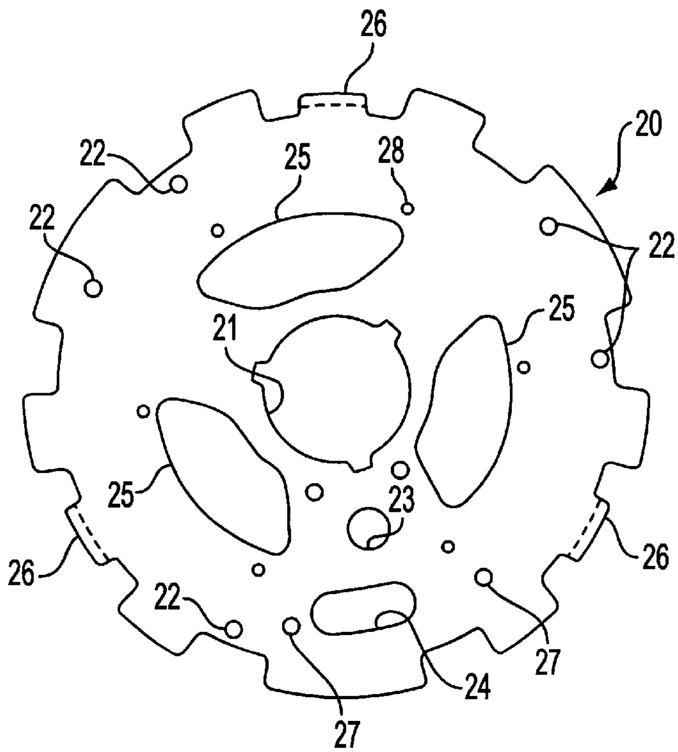
FIG. 4 is a plan view of a fixed case used in the bicycle brake shown in FIG. 1.

As shown in FIG. 4, the first fixed side case 20 as a whole is in the form of a disk, in the center of which is formed the detent hole 21 that engages the first lock seat 4 on the hub axle 1. Three spaces 25 are formed in such a way that three arms extend from this detent hole 21. Six detent holes 28 are circumferentially disposed near the outside borders of the spaces 25. A detent hole 23 through which passes the swinging shaft of the operating arm 80 is provided in one of the three arms, and a long hole 24 is disposed radially outwardly from the detent hole 23. A detent 53 located on cam member 50 passes through long hole 24 in order to engage with a second link arm 85 attached to operating arm 80. The long hole extends peripherally in the form of an arc and has an angle range of about 30 degrees relative to the hub axle 1 for allowing arcuate movement of detent 53. Four detent holes 27 which are used to fix a case 88 for housing the second link arm 85 are provided in the region where the detent hole 23 is provided. Detent holes 22 for fixing the second fixed side case 40 to the first fixed side case 20 are provided on the outer peripheral portion of the first fixed side case 20. Three axially extending protrusions 26 are provided in three peripheral locations at equivalent angles. These are formed by bending the peripheral component of the first fixed side case 20 at 90 degrees, and they are used to position the brake shoe 70 described below.

As shown in FIG. 1, a holding component 41 is attached to the second fixed side case 40, and a support arm 45 is attached to holding component 41. The support arm 45 extends generally perpendicular from the holding component 41 and generally parallel with the bicycle frame F. Support arm 45 is attached to attaching bands 46 through screws 45*a* for fixing first fixed side plate 20 and second fixed side plate 40 to the bicycle frame so that first fixed side plate 20 and second fixed side plate 40 are prevented from rotating about the hub axle 1.

Figure 2:
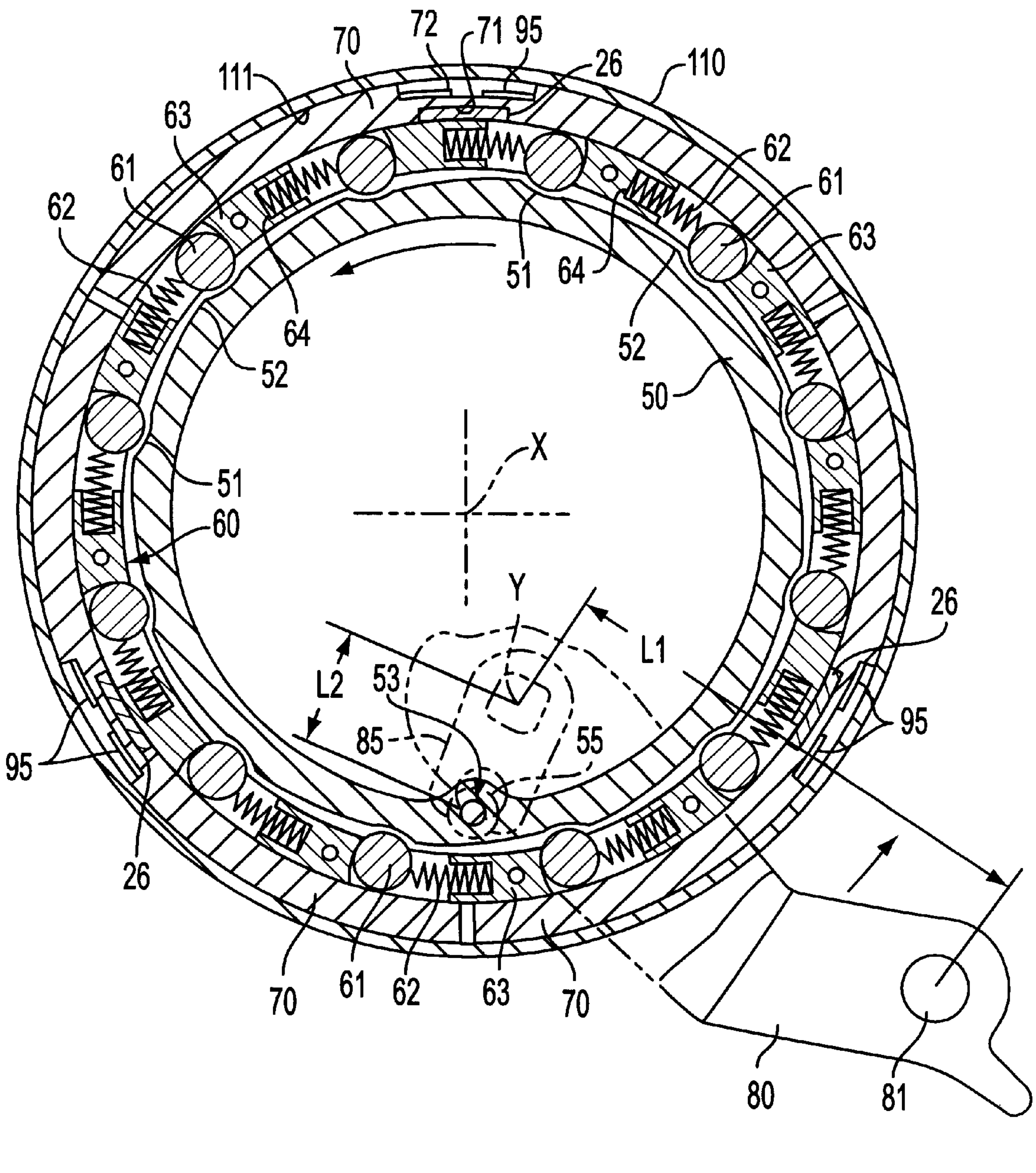
FIG. 2 is a side view of the internal structure of the bicycle brake shown in FIG. 1.

As shown in FIGS. 2 and 3, cam member 50 is rotatably mounted relative to the first fixed side case. The outer peripheral surface of cam member 50 has a plurality of base components 51 and a plurality of cam surfaces 52. The plurality of base components 51 define the base position corresponding to the non-operating position of rollers 61, and the plurality of cam surfaces 52 define the operating positions of rollers 61. In FIG. 2, each base component 51 defining the base position is furnished with a wall to prevent its associated roller 61 from moving counter-clockwise in the peripheral direction of cam member 50. The cam surfaces 52 extend radially outwardly in the clockwise direction. The cam member 50 has a detent 53 for supporting a protrusion 55 that engages with the second link arm 85, and a detent hole 54 in which the protrusion 55 is located.

The inner peripheral diameter of the cam member 50 is about 83 mm. The cam member 50 is thus made with a large diameter so that a cam member space can be formed radially inwardly of the cam member 50, thus making it possible to house part of the hub drum 2 or part of the attachment mechanism that fixes the rotating side case 100 to the hub drum 2. This, in turn, makes it possible to reduce the axial width of the hub drum 2 and brake device assembly. As an additional benefit, a hub drum 2 having a substantial wall thickness with little possibility of breaking can be used when the cam member 50 has this diameter. The inner peripheral diameter of the cam member 50 should be at least 70 mm.

The operating mechanism for operating the cam member 50 is described below. One end of the brake operating cable W1 is attached a connecting component 81 fitted on the operating arm 80 which, in turn, extends from a base 82. The base 82 has an engagement groove that mates with a square-shaped portion of a swinging shaft 84. Base 82 also has a space that accommodates a spring 87 that biases operating arm 80 in the counter-clockwise direction in FIG. 1.

One end of the swinging shaft 84 passes through the detent hole 23 of the first fixed side case 20 and is fastened with a fastener. The outer peripheral surface of the swinging shaft 84 is cylindrical at the location where it passes through a case 88 housing the second link arm 85 and at the location where it passes through the detent hole 23. This ensures smooth relative rotation. The swinging shaft 84 thus swings about a swing axis Y located radially outwardly from the axis X of the hub axle 1. The length L1 of the operating arm 80 from the point where the brake operating cable W1 is engaged to the axis Y is about 4 times greater than the length L2 of the second link arm 85 from the axis Y to the point where it is engaged with the protrusion 55. The operating force needed to operate the brake can be reduced because of the lower L2/L1 ratio.

As shown in FIG. 3, the base 82 of the operating arm 80 is in contact with the outer face of the case 88. One end of the spring 87 is engaged with the operating arm 80, and the other end is engaged with the case 88. In this embodiment, base 82 has a plurality of grooves that engage with the end of the spring 87, thus allowing the biasing force of the spring 87 to be adjusted. The second link arm 85 is engaged with a square shaped component of the swinging shaft 84 so that second link arm 85 swings integrally with the operating arm 80. The free end of the second link arm 85 has a bifurcation, between which the protrusion 55 attached to the detent hole 54 of the cam member 50 is held and engaged, thus allowing second link arm 85 to swing cam member 50 in two directions.

Figure 5:
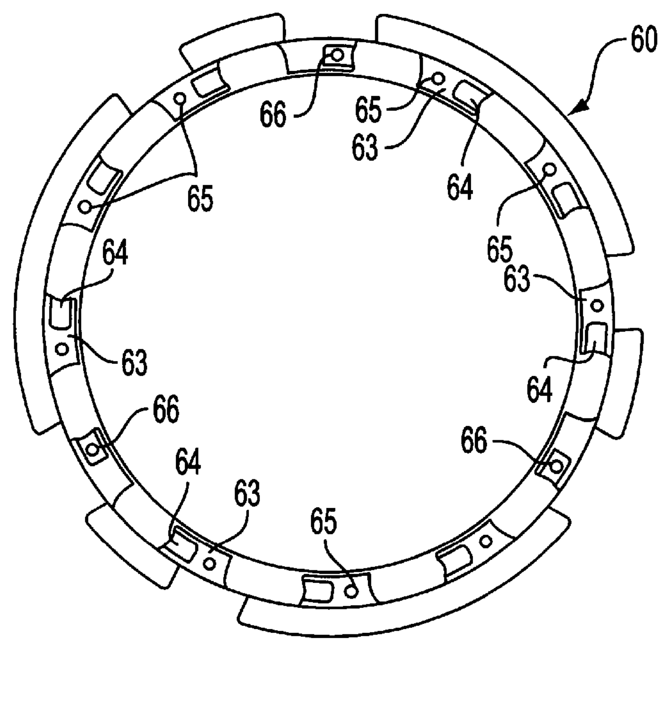
FIG. 5 is a plan view of a roller case used in the bicycle brake shown in FIG. 1.

A roller case 60 having the structure shown in FIG. 5 is disposed radially outwardly from the cam member 50 as shown in FIG. 2. The entire roller case 60 is ring-shaped, with twelve axially protruding spring cases 63 uniformly distributed at equal angles along the circumference thereof. Rollers 61 having a cylindrical shape are housed one at a time in the intervals between these spring cases 63, and the rollers 61 are biased in the clockwise direction by springs 62. As a result, due to the incline of the cam surface 52, the rollers 61 are biased radially outwardly by the springs 62. One end of each spring is in contact with an adjacent roller 61, and the other end of each spring is housed in the concave components 64 provided for each spring case 63. A plurality of detent holes 65 and 66 are provided through the spring cases 63 of the roller case 60. Of the detent holes, detent holes 65 align with the detent holes 22 in the first fixed side case 20 and detent holes 43 in the second fixed side case 40.

Figure 7A:
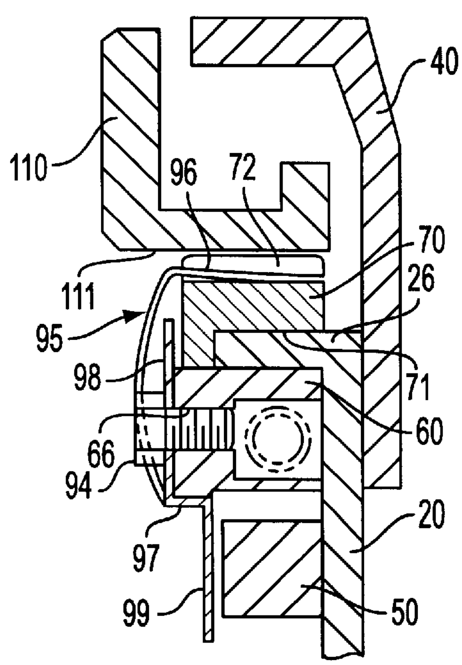
FIGS. 7A and 7B are detailed side cross sectional views illustrating the connections between the roller case and the fixed case used in the bicycle brake shown in FIG. 1.
Figure 7B:
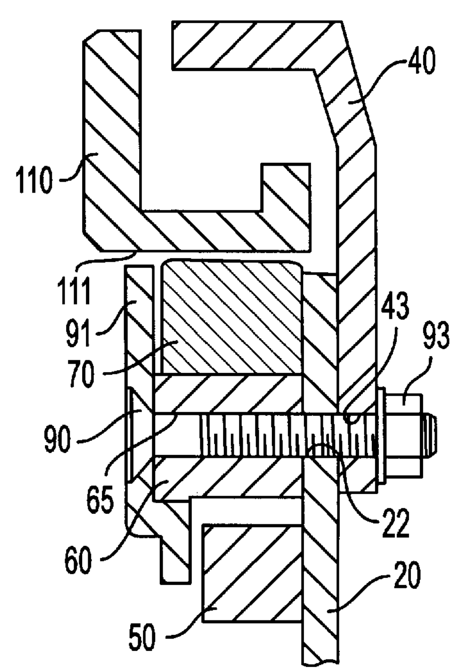
Figure 8:
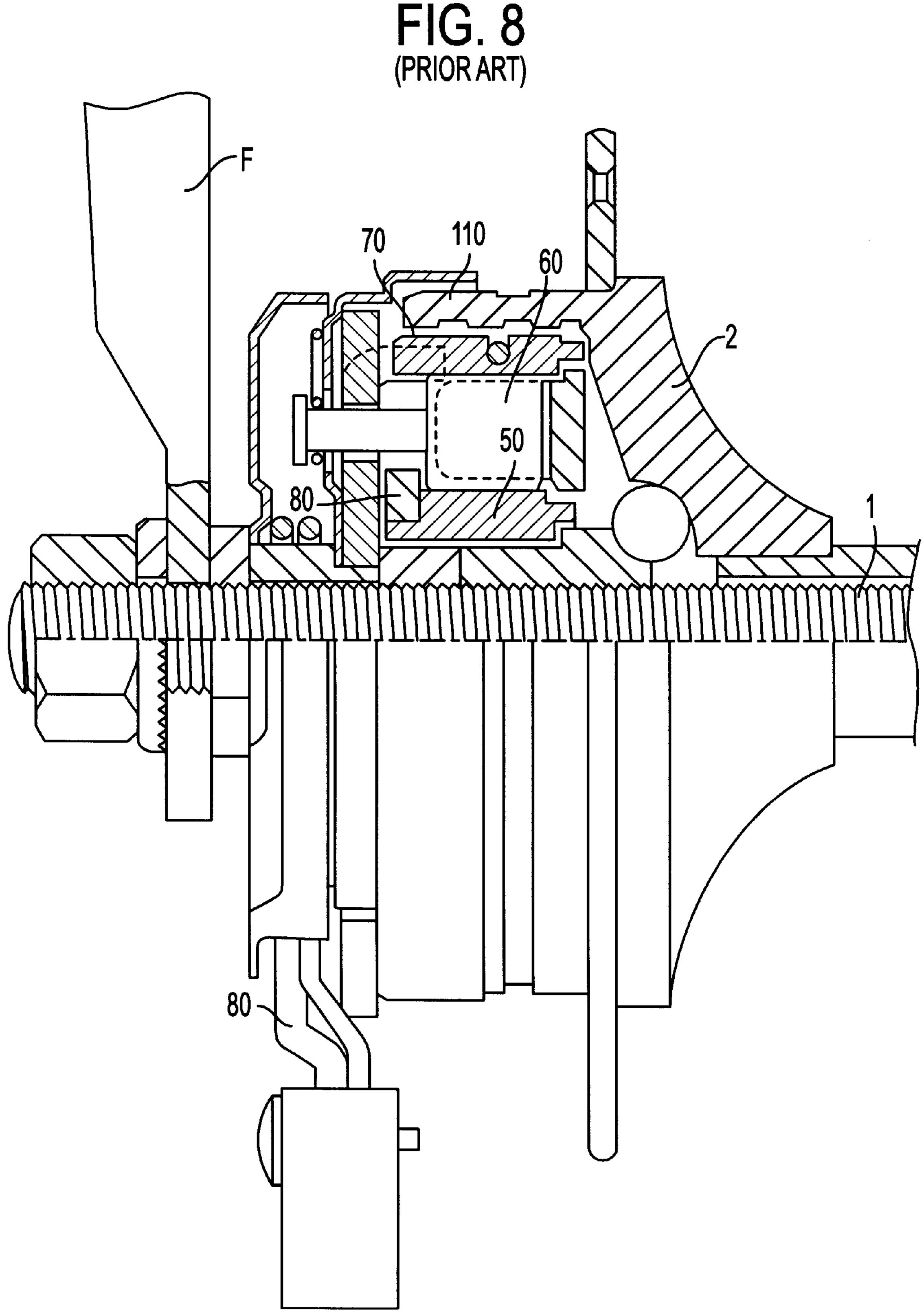
FIG. 8 is a cross sectional view of a prior art bicycle brake.

As indicated in FIG. 7B, the roller case 60, the first fixed side case 20, and the second fixed side case 40 are fixed by attachment bolts 90 and nuts 93. Presser plates 91 are attached to the heads of the attachment bolts 90. Part of each presser plate 91 extends from the outer peripheral surface of the cam member 50 radially inward, thus effectively retaining the cam member 50 to first fixed side plate 20. Another part of each pressing plate 91 extends from the inner peripheral surface of the brake shoe 70 radially outward, thus effectively retaining the brake shoe 70 to first fixed side plate 20. The brake shoe 70 is disposed radially outwardly of the roller case 60.

Figure 6:
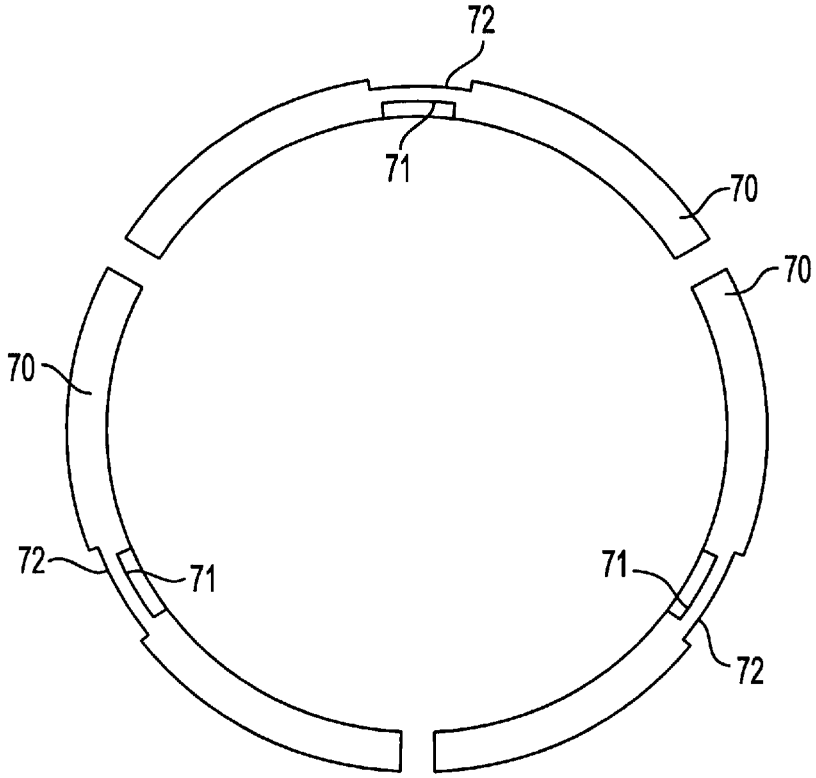
FIG. 6 is a side view of the brake shoes used in the bicycle brake shown in FIG. 1.

As shown in FIG. 6, the brake assembly is constructed of three similarly shaped brake shoes 70. Each of these brake shoes 70 has a first concave component 71 and second concave component 72, both formed in the central portion of each brake shoe 70 and mutually spaced apart by approximately 120 degrees. As indicated in FIG. 7A, the first concave component 71 is a groove for engaging with the protrusions 26 of the first fixed side case 20. The engagement between the protrusions 26 and the first concave component 71 holds the brake shoes 70 in their respective peripheral locations. The second concave component 72 is a groove for engaging a plate spring 95. The plate springs 95 have an axially extending surface 96 and a surface 97 parallel to the surface 96. The surface 96 engages with the second concave component 72 of the brake shoes 70, and the surface 97 engages with the under-surface of the roller case 60 so that the brake shoes 70 are biased radially inwardly by the plate springs 95.

The plate springs 95 also have a holding component 98 with a detent hole for receiving a screw 94 therethrough. The screw 94 is threaded into the screw hole 66 provided in the roller case 60 so that the plate spring is fixed to the roller case 60. The plate springs 95 are further equipped with an extended surface 99 that extends perpendicular to the surface 97 and radially inwardly thereof.

The materials used for the brake shoes 70 may be aluminum alloy or rubber materials. The outer peripheral surface of each brake shoe 70 is about 60 mm from the axis of the hub axle 2. The increase in the diameter of the brake shoes 70 results in a potentially greater surface area in the plane of contact on which the braking action occurs. For a given area for the plane of contact, the enlarged diameter of the brake shoes allows a thinner brake device B to be made. The axial thickness of the brake shoes 70 in this embodiment is 7.5 mm, which is thinner than the brake shoes of conventional roller brakes.

As shown in FIG. 3, the rotating side case 100 is in the form of a disk with a hole in the center through which the hub axle 1 passes. Four detent holes 102 are provided in the radially inward region of rotating side case 100, and these detent holes 102 align with threaded detent holes 10 provided in the hub drum 2. The rotating side case 100 is fixed to hub drum 2 by bolts 113 having a head 114 so that rotating side case 100 rotates integrally with the hub drum 2. A brake ring 110 is fixed in the outer peripheral region of the rotating side case 100 by attachment screws 103 passing through eight detent holes 101 located in the rotating side case 100. The brake ring 110 has a contact surface 111 that extends axially and comes into contact with the contact surface of the brake shoes 70 during braking. Four radially extending heat radiator plates 105 are axially integrated at the periphery of the rotating side case 100.

As a result of this structure, when a brake lever attached to the handle (not shown in figure) is operated, the operating arm 80 can be swung in the direction of the arrow in FIG. 2, and the cam member 50 can be swung so that rollers 61 are pressed radially outwardly. This, in turn, causes brake shoes 70 to contact surface 111 of brake ring 110. When the brake lever is released, the cam member 50 is returned via the second link arm 85 to the opposite side by the biasing springs 87 provided at the base 82 of the operating arm 80, thus releasing the braking force.

As shown in FIG. 3, the heads 114 of bolts 113 are positioned between the hub axle 1 and cam member 50. Also, the heads 114 of bolts 113 are accommodated in the cam member space defined radially inwardly of cam member 50. In this embodiment, a portion of hub drum 2 also is accommodated within the cam member space defined radially inwardly of cam member 50. The cam member 50 is not positioned in tandem with the hub drum 2 as in prior art hub brake designs, thus resulting in a more axially compact design.

While the above is a description of on embodiment of the present invention, further modifications may be employed without departing from the spirit and scope of the present invention. For example, the size, shape, location or orientation of the various components may be changed as desired. The functions of one element may be performed by two, and vice versa. In the described embodiment, the first fixed side case was attached to the second fixed side case 40 through bolts 93, and both fixed side cases were fixed relative to the hub axle 1 through support arm 45 and attachment bands 46, but the fixed relationship may also be formed by providing a spline in the first lock seat 4, and by providing a groove in the first fixed side case 20 to engage the spline. A cylindrical roller 61 was used as a brake operating element in this embodiment, but a spherical ball may also be used instead.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle brake comprising:

a fixed member having a fixed member axis;

a hub drum rotatably supported around the fixed member;

a fixed case nonrotatably fixed relative to the fixed member;

a brake member;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element, and wherein the cam member defines a cam member space radially inwardly of the cam member;

a rotating case having a contact surface disposed radially outwardly of the brake member for contacting the brake member when the brake member moves radially outwardly, wherein the rotating case is coupled to the hub drum for rotating integrally therewith; and wherein a portion of the hub drum is disposed within the cam member space between the fixed member and the cam member.

2. A bicycle brake comprising:

a fixed member having a fixed member axis;

a hub drum rotatable supported around the fixed member, a fixed case nonrotatably fixed relative to the fixed member;

a brake member;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element, and wherein the cam member defines a cam member space radially inwardly of the cam member;

a rotating case having a contact surface disposed radially outwardly of the brake member for contacting the brake member when the brake member moves radially outwardly, wherein the rotating case is coupled to the hub drum for rotating integrally therewith;

wherein a portion of the hub drum is disposed within the cam member space;

wherein the cam member is rotatably coupled to the fixed case, and further comprising a cam operating member for rotating the cam member, wherein the cam operating member includes a first link arm coupled for rotation around a rotational axis radially offset from the fixed member axis.

3. The bicycle brake according to claim 2 wherein the cam operating member further comprises a second link arm extending from the first link arm and inclined relative to the first link arm for engaging a detent on the cam member.

4. The bicycle brake according to claim 1 further comprising a brake member biasing element which biases the brake member radially inwardly.

5. The bicycle brake according to claim 1 wherein the cam member includes a cam surface for pushing the brake operating element radially outwardly when the cam member and the brake operating element rotate relative to each other, and further comprising:

a brake operating element case fixed relative to the fixed case; and a brake operating element biasing element for biasing the brake operating element toward the cam surface of the cam member so that the brake operating element is biased radially outwardly.

6. The bicycle brake according to claim 5 further comprising a brake member biasing element which biases the brake member radially inwardly.

7. The bicycle brake according to claim 6 wherein the brake member biasing element is mounted to the brake operating element case.

8. The bicycle brake according to claim 1 wherein the brake operating element comprises a roller.

9. The bicycle brake according to claim 1 wherein there is a plurality of the brake members encircling the fixed member, wherein the cam member encircles the fixed member, wherein there is a plurality of the brake operating elements circumferentially disposed along an outer peripheral surface of the cam member, wherein the outer peripheral surface of the cam member includes a plurality of cam surfaces, and wherein each cam surface is disposed in close proximity to one of the plurality of brake operating elements so that the plurality of cam surfaces press the plurality of brake operating elements outwardly when the cam member and the plurality of brake operating elements rotate relative to each other.

10. The bicycle brake according to claim 9 further comprising:

a brake operating element case fixed relative to the fixed case; and a plurality of brake operating element biasing elements, wherein each brake operating element biasing element contacts a corresponding brake operating element for biasing the corresponding brake operating element toward its associated cam surface of the cam member so that the plurality of brake operating elements are biased radially outwardly.

11. The bicycle brake according to claim 1 wherein the fixed member comprises a hub axle.

12. A bicycle brake comprising:

a fixed member having a fixed member axis;

a hub drum rotatably supported around the fixed member;

a fixed case nonrotatably fixed relative to the fixed member;

a brake member;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element, and wherein the cam member defines a cam member space radially inwardly of the cam member;

a rotating case having a contact surface disposed radially outwardly of the brake member for contacting the brake member when the brake member moves radially outwardly;

an attachment mechanism for coupling the rotating case to the hub drum so that the rotating case rotates integrally with the hub drum; and wherein a portion of the attachment mechanism is disposed within the cam member space.

13. The bicycle brake according to claim 12 wherein the cam member is rotatably coupled to the fixed member, and further comprising a cam operating member for rotating the cam member, wherein the cam operating member includes a first link arm coupled for rotation around a rotational axis radially offset from the fixed member axis.

14. The bicycle brake according to claim 13 wherein the cam operating member further comprises a second link arm extending from the first link arm and inclined relative to the first link arm for engaging a detent on the cam member.

15. The bicycle brake according to claim 12 further comprising a brake member biasing element which biases the brake member radially inwardly.

16. The bicycle brake according to claim 12 wherein the cam member includes a cam surface for pushing the brake operating element radially outwardly when the cam member and the brake operating element rotate relative to each other, and further comprising:

a brake operating element case fixed relative to the fixed case; and a brake operating element biasing element for biasing the brake operating element toward the cam surface of the cam member so that the brake operating element is biased radially outwardly.

17. The bicycle brake according to claim 16 further comprising a brake member biasing element which biases the brake member radially inwardly.

18. The bicycle brake according to claim 17 wherein the brake member biasing element is mounted to the brake operating element case.

19. The bicycle brake according to claim 12 wherein the brake operating element comprises a roller.

20. The bicycle brake according to claim 12 wherein there is a plurality of the brake members encircling the fixed member, wherein the cam member encircles the fixed member, wherein there is a plurality of the brake operating elements circumferentially disposed along an outer peripheral surface of the cam member, wherein the outer peripheral surface of the cam member includes a plurality of cam surfaces, and wherein each cam surface is disposed in close proximity to one of the plurality of brake operating elements so that the plurality of cam surfaces press the plurality of brake operating elements outwardly when the cam member and the plurality of brake operating elements rotate relative to each other.

21. The bicycle brake according to claim 20 further comprising:

a brake operating element case fixed relative to the fixed case; and a plurality of brake operating element biasing elements, wherein each brake operating element biasing element contacts a corresponding brake operating element for biasing the corresponding brake operating element toward its associated cam surface of the cam member so that the plurality of brake operating elements are biased radially outwardly.

22. The bicycle brake according to claim 12 wherein the fixed member comprises a hub axle.

23. A bicycle brake apparatus comprising:

a brake member;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element;

a rotatable case having a contact surface disposed radially outwardly of the brake member for contacting the brake member when the brake member moves radially outwardly; and a threaded attachment member for attaching the rotatable case to a bicycle hub for rotation therewith.

24. A bicycle brake apparatus comprising:

a brake member;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element, and wherein the cam member has a cam member inner peripheral surface;

a rotatable case including:

a contact surface disposed radially outwardly of the brake member for contacting the brake member when the brake member moves radially outwardly;

a rotatable case inner peripheral surface defining a central opening aligned radially inwardly from the cam member inner peripheral surface; and an attachment opening disposed radially outwardly from the central opening for receiving a fastener therethrough for attaching the rotatable case to a bicycle hub.

25. The apparatus according to claim 24 wherein the attachment opening is aligned radially inwardly of the cam member inner peripheral surface.

26. A bicycle brake apparatus comprising:

a brake member;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element, and wherein the cam member includes a cam member inner peripheral surface having an inner peripheral diameter of at least 70 millimeters; and a rotatable case having a contact surface disposed radially outwardly of the brake member for contacting the brake member when the brake member moves radially outwardly.

27. The apparatus according to claim 26 wherein the inner peripheral diameter is approximately 83 millimeters.

28. A bicycle brake apparatus comprising:

a brake member having an outer peripheral surface that defines an arc with a radius of curvature relative to an axis, wherein the radius of curvature is approximately 60 millimeters;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element; and a rotatable case having a contact surface disposed radially outwardly of the brake member for contacting the brake member when the brake member moves radially outwardly.

29. A bicycle brake apparatus comprising:

a brake member having an outer peripheral surface that defines an arc with a radius of curvature relative to an axis, wherein the outer peripheral surface has an axial thickness of approximately 7.5 millimeters;

a brake operating element disposed radially inwardly of the brake member for pushing the brake member radially outwardly;

a cam member disposed radially inwardly of the brake operating element, wherein the cam member is shaped so that the brake operating element moves radially outwardly in response to relative rotation between the cam member and the brake operating element; and a rotatable case having a contact surface disposed radially outwardly of the brake member for contacting the brake member when the brake member moves radially outwardly.

30. The bicycle brake according to claim 1 wherein the fixed member, the hub drum and the cam member overlap perpendicular to the fixed member axis.

* * * * *